(12) United States Patent
Hu et al.

(10) Patent No.: US 12,512,929 B2
(45) Date of Patent: Dec. 30, 2025

(54) TRANSMISSION METHODS OF PROBABILISTIC SHAPING MODULATION IN WIRELESS COMMUNICATIONS

(71) Applicant: MediaTek Inc., Hsinchu (TW)

(72) Inventors: Shengquan Hu, San Jose, CA (US);
Jianhan Liu, San Jose, CA (US);
Thomas Edward Pare, Jr., San Jose, CA (US)

(73) Assignee: MediaTek Inc. (TW)

( * ) Notice: Subject to any disclaimer, the term of this patent is extended or adjusted under 35 U.S.C. 154(b) by 0 days.

(21) Appl. No.: 18/621,261

(22) Filed: Mar. 29, 2024

(65) Prior Publication Data

US 2024/0333424 A1 Oct. 3, 2024

Related U.S. Application Data

(60) Provisional application No. 63/493,064, filed on Mar. 30, 2023.

(51) Int. Cl.
| | | |
|---|---|---|
| *H04L 1/00* | (2006.01) | |
| *H04L 27/00* | (2006.01) | |
| *H04L 27/36* | (2006.01) | |
| *H04L 27/38* | (2006.01) | |

(52) U.S. Cl.
CPC .......... *H04L 1/0057* (2013.01); *H04L 27/366* (2013.01); *H04L 27/3818* (2013.01)

(58) Field of Classification Search
CPC . H04L 1/0057; H04L 1/0042; H04L 27/3818; H04L 27/366
See application file for complete search history.

(56) References Cited

U.S. PATENT DOCUMENTS

| | | | | |
|---|---|---|---|---|
| 12,323,239 | B2* | 6/2025 | Wu | H04L 1/0042 |
| 2020/0382139 | A1* | 12/2020 | Yoffe | H04L 27/3405 |
| 2024/0106691 | A1* | 3/2024 | Hu | H04L 27/362 |
| 2024/0137154 | A1* | 4/2024 | Li | H04L 1/0071 |
| 2024/0380515 | A1* | 11/2024 | Sen | H03M 13/155 |

* cited by examiner

*Primary Examiner* — Justin R Knapp
(74) *Attorney, Agent, or Firm* — Andy M. Han; Han IP PLLC

(57) ABSTRACT

Techniques pertaining to transmission methods of probabilistic shaping (PS) modulation in wireless communications are described. An apparatus (e.g., station (STA)) processes each subblock of a plurality of subblocks of a data unit by padding each subblock after scrambling and PS mapping each subblock to result in each subblock having a fixed length before further processing including encoding and modulation. The apparatus then transmits the plurality of processed subblocks.

6 Claims, 14 Drawing Sheets

1200 

PROCESS, BY A PROCESSOR OF AN APPARATUS, EACH SUBBLOCK OF A PLURALITY OF SUBBLOCKS OF A DATA UNIT BY PADDING EACH SUBBLOCK AFTER SCRAMBLING AND PROBABILISTIC SHAPING (PS) MAPPING EACH SUBBLOCK TO RESULT IN EACH SUBBLOCK HAVING A FIXED LENGTH BEFORE FURTHER PROCESSING INCLUDING ENCODING AND MODULATION

1210

TRANSMIT, BY THE PROCESSOR, THE PLURALITY OF PROCESSED SUBBLOCKS

1300 

```
┌─────────────────────────────────────────────────────────────┐
│                                                             │
│   RECEIVE, BY A PROCESSOR OF AN APPARATUS, A PLURALITY OF   │
│              SUBBLOCKS OF A DATA UNIT                       │
│                                                             │
│                         1310                                │
│                                                             │
└─────────────────────────────────────────────────────────────┘
```

```
┌─────────────────────────────────────────────────────────────┐
│                                                             │
│  PROCESS, BY THE PROCESSOR, EACH SUBBLOCK OF THE PLURALITY OF│
│   SUBBLOCKS BY DE-MAPPING EACH SUBBLOCK USING A PROBABILISTIC│
│   SHAPING (PS) DE-MAPPER AFTER PERFORMING DEMODULATION AND  │
│  DECODING ON EACH SUBBLOCK, WITH THE PS DE-MAPPER OUTPUTTING │
│    A FIRST FIXED NUMBER OF OUTPUT BITS FOR EVERY SECOND FIXED│
│                     NUMBER OF INPUT BITS                    │
│                                                             │
│                         1320                                │
│                                                             │
└─────────────────────────────────────────────────────────────┘
```

SELECT, BY A PROCESSOR OF AN APPARATUS, ONE OR MORE UNUSED CONSTELLATION POINTS IN A PROBABILISTIC SHAPING (PS) MODULATION PLOT AS ONE OR MORE SIGNATURE SYMBOLS

1410

PROCESS, BY THE PROCESSOR, A DATA UNIT BY INSERTING THE ONE OR MORE SIGNATURE SYMBOLS AFTER EVERY FIXED NUMBER OF BITS OF THE DATA UNIT HAVING BEEN SCRAMBLED, PS MAPPED, ENCODED AND QUADRATURE AMPLITUDE MODULATION (QAM) MODULATED

1420

TRANSMIT, BY THE PROCESSOR, THE PROCESSED DATA UNIT

TRANSMISSION METHODS OF PROBABILISTIC SHAPING MODULATION IN WIRELESS COMMUNICATIONS

CROSS REFERENCE TO RELATED PATENT APPLICATION

The present disclosure is part of a non-provisional patent application claiming the priority benefit of U.S. Provisional Patent Application No. 63/493,064, filed 30 Mar. 2023, the content of which herein being incorporated by reference in its entirety.

TECHNICAL FIELD

The present disclosure is generally related to wireless communications and, more particularly, to transmission methods of probabilistic shaping modulation in wireless communications.

BACKGROUND

Unless otherwise indicated herein, approaches described in this section are not prior art to the claims listed below and are not admitted as prior art by inclusion in this section.

In wireless communications such as Wi-Fi (or WiFi) and wireless local area networks (WLANs) in accordance with one or more Institute of Electrical and Electronics Engineers (IEEE) 802.11 standards, probabilistic shaping (PS) 4096 quadrature amplitude modulation (QAM), herein interchangeably referred to as "PS-4096QAM" and "PS-4KQAM", has been discussed as one potential physical-layer (PHY) feature for next-generation Wi-Fi. About 1.5~2 dB performance gain of PS-4KQAM versus normal 4KQAM may be observed in simulations. However, varying lengths and error propagation problems tend to render usage of PS-QAM challenging and difficult. In particular, error propagation of PS de-mapping tends to cause an issue in that there is no 4-byte alignment with respect to the delimiter of aggregated medium access control protocol data unit (A-MPDU) anymore. Therefore, there is a need for a solution of transmission methods of probabilistic shaping modulation in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to transmission methods of probabilistic shaping modulation in wireless communications. It is believed that implementation of one or more schemes proposed herein may resolve the aforementioned issue of PS de-mapping error propagation and render the PS de-mapper output still 4 bytes aligned.

In one aspect, a method may involve processing each subblock of a plurality of subblocks of a data unit by padding each subblock after scrambling and PS mapping each subblock to result in each subblock having a fixed length before further processing including encoding and modulation. The method may also involve transmitting the plurality of processed subblocks.

In another aspect, a method may involve receiving a plurality of subblocks of a data unit. The method may also involve processing each subblock of the plurality of subblocks by de-mapping each subblock using a PS de-mapper after performing demodulation and decoding on each subblock. The PS de-mapper may output a first fixed number of output bits for every second fixed number of input bits.

In yet another aspect, a method may involve selecting one or more unused constellation points in a PS modulation plot as one or more signature symbols. The method may also involve processing a data unit by inserting the one or more signature symbols after every fixed number of bits of the data unit having been scrambled, PS mapped, encoded and QAM modulated. The method may further involve transmitting the processed data unit.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 12 is a flowchart of an example process in accordance with an implementation of the present disclosure.

FIG. 13 is a flowchart of an example process in accordance with an implementation of the present disclosure.

FIG. 14 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to transmission methods of probabilistic shaping modulation in wireless communications. According to the present disclosure, a number of possible solutions may be implemented separately or jointly. That is, although these possible solutions may be described below separately, two or more of these possible solutions may be implemented in one combination or another.

Figure 1:
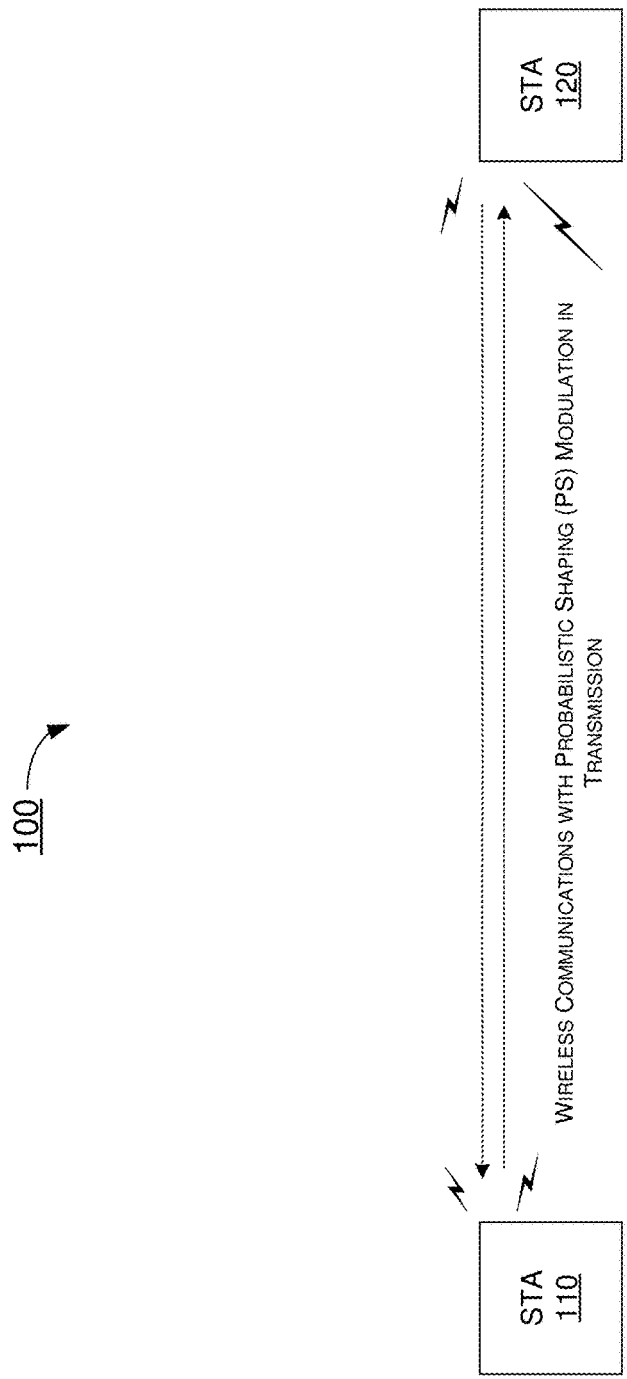
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 14 illustrate examples of implementation of various proposed schemes in network environment 100 in accordance with the present disclosure. The following description of various proposed schemes is provided with reference to FIG. 1~FIG. 14.

Referring to FIG. 1, network environment 100 may involve at least a station (STA) 110 communicating wirelessly with a STA 120. Either of STA 110 and STA 120 may be an access point (AP) STA or, alternatively, either of STA 110 and STA 120 may function as a non-AP STA. In some cases, STA 110 and STA 120 may be associated with a basic service set (BSS) in accordance with one or more IEEE 802.11 standards (e.g., IEEE 802.11be and future-developed standards such as IEEE 802.11bn). Each of STA 110 and STA 120 may be configured to communicate with each other by utilizing the transmission methods of probabilistic shaping modulation in wireless communications in accordance with various proposed schemes described below. That is, either or both of STA 110 and STA 120 may function as a "user" in the proposed schemes and examples described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

As alluded to above, there remain certain issues and challenges regarding PS-4096QAM. One issue pertains to "varying packet length" of PS-mapper on the transmitter side. Another issue is the delimiter problem caused by the "varying packet length" of PS-de-mapper output due to decoding error of some codewords, and this medium access control (MAC) delimiter issue is equivalent to descrambler synchronization issue at the PHY side. According to current IEEE 802.11 specification, if the MAC protocol data unit (MPDU) delimiter is valid, the MPDU is extracted from the A-MPDU, and the next MPDU delimiter is expected at the first multiple of 4 octets immediately after the current MPDU. This process is continued until the end of the PHY protocol data unit (PPDU) is reached. Moreover, the delimiter signature can be used to reduce the amount of computation required while scanning for a valid delimiter. In this case, the receiver tests each possible delimiter for a matching Delimiter Signature field to check the cyclic redundancy check (CRC) only when a match is discovered.

Figure 2:
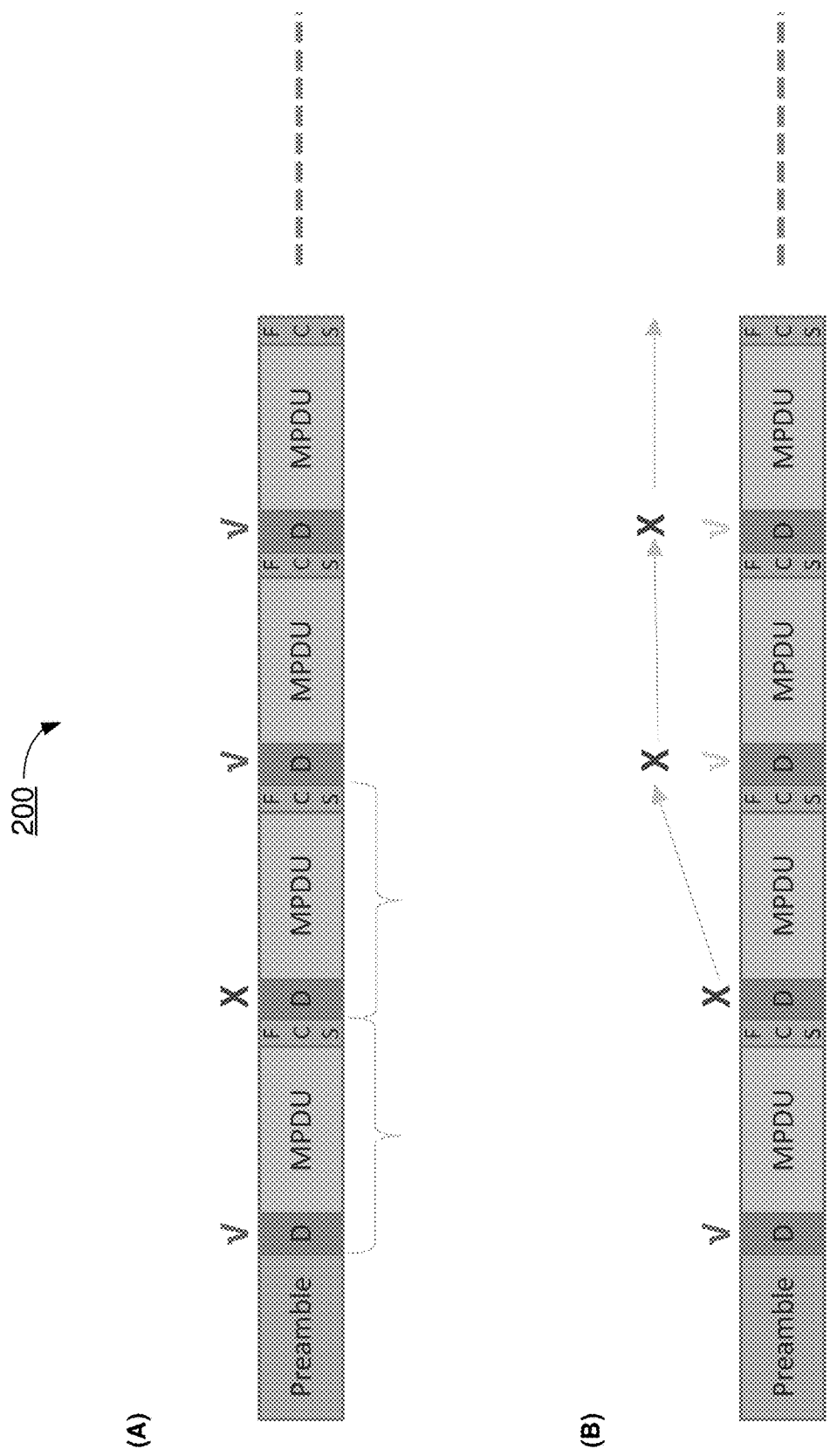
FIG. 2 is a diagram of an example scenario under a proposed scheme in accordance with the present disclosure.

FIG. 2 illustrates an example scenario 200 depicting the PS-4096 QAM delimiter issue. When a given A-MPDU is transmitted with normal 4096QAM, there is no error propagation issue. Referring to part (A) of FIG. 2, when there is one failed MPDU, the delimiter detection of other MPDUs would not be affected. Under the current IEEE 802.11 specification, the delimiter in each MPDU is 4-byte aligned. If a delimiter is decoded with CRC fail for one MPDU, without knowing the MPDU length, the MAC layer can still find the next MPDU delimiter by matching the 8-bit signature in the next delimiter every 4 bytes. Referring to part (B) of FIG. 2, in an A-MPDU with PS-4096QAM, one failed MPDU will cause failure of all the following MPDUs due to error propagation from the PS de-mapper. This is because for PS-4096QAM, if one MPDU is decoded with error, the next MPDU header is not 4-byte aligned.

Figure 3:
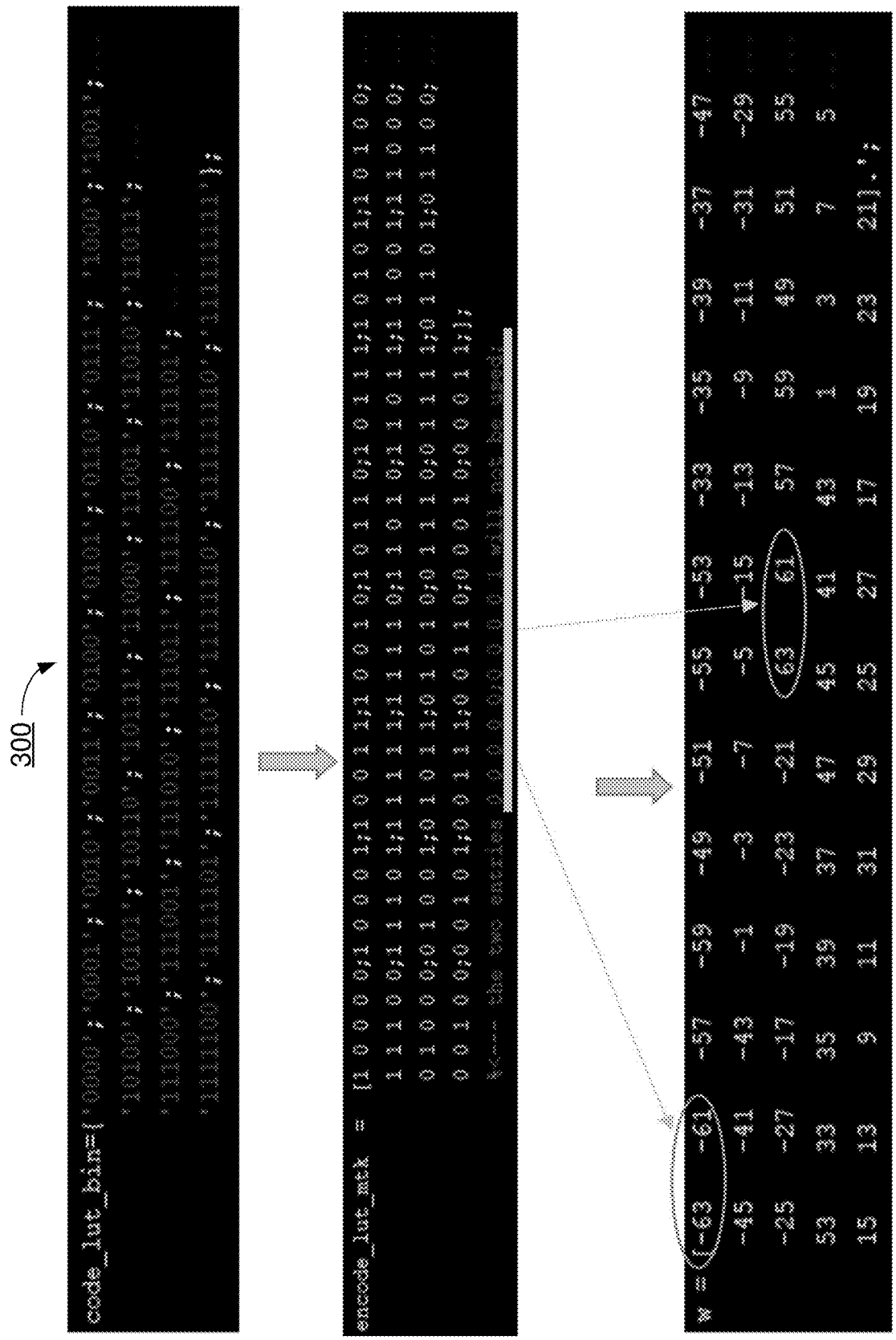
FIG. 3 is a diagram of an example scenario under a proposed scheme in accordance with the present disclosure.
Figure 4:
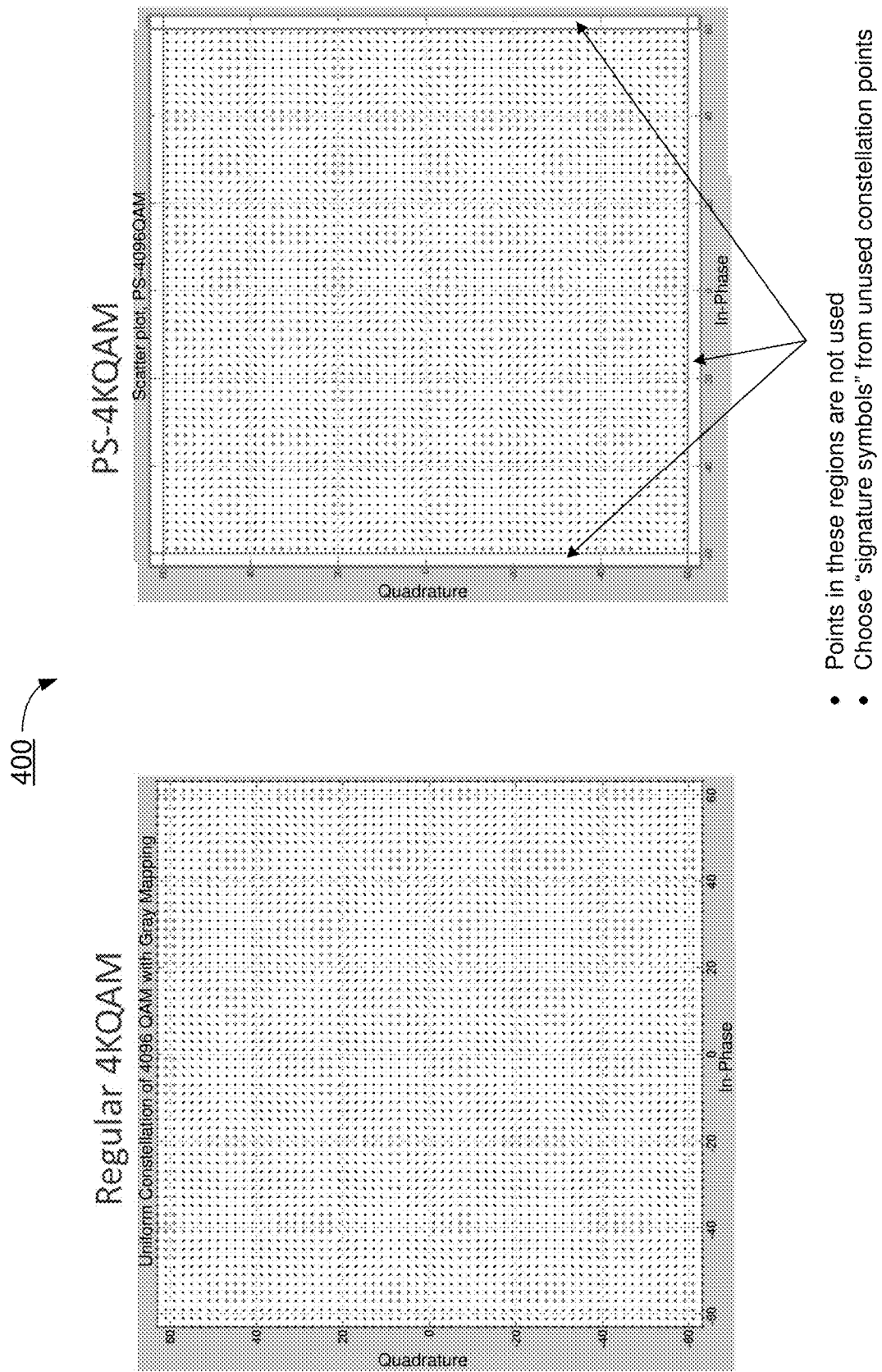
FIG. 4 is a diagram of an example scenario under a proposed scheme in accordance with the present disclosure.

FIG. 3 illustrates an example scenario 300 of PS-4096QAM constellation mapping. FIG. 4 illustrates an example scenario 400 of normal 4096QAM versus PS-4096QAM, plotted at the same scale of axes [−63 63 −63 63]. It is noteworthy that there are a total of 496 constellation points in the marginal regions on the sides of the plot of PS-4096QAM are never used. Specifically, constellation points with I=±63/±61 and/or Q=±63/±61 are never used.

Under various proposed schemes described below, some of these unused symbols may be utilized as "signature symbols" and may be selected or otherwise chosen from the unused constellation points. Under the proposed schemes, The unused constellation points may be utilized to limit error propagation, to synchronize descramblers, and to resolve the MPDU delimiter issue. The unused constellation points may be selected or otherwise chosen from the 496 unused constellation points to serve as a "signature sequence" to minimize false detection. The signature points of the signature sequence may be transmitted with a transmit power higher than that in transmitting other information-carrying constellation points so as to enhance reliability in detection of such signature points.

Figure 5:
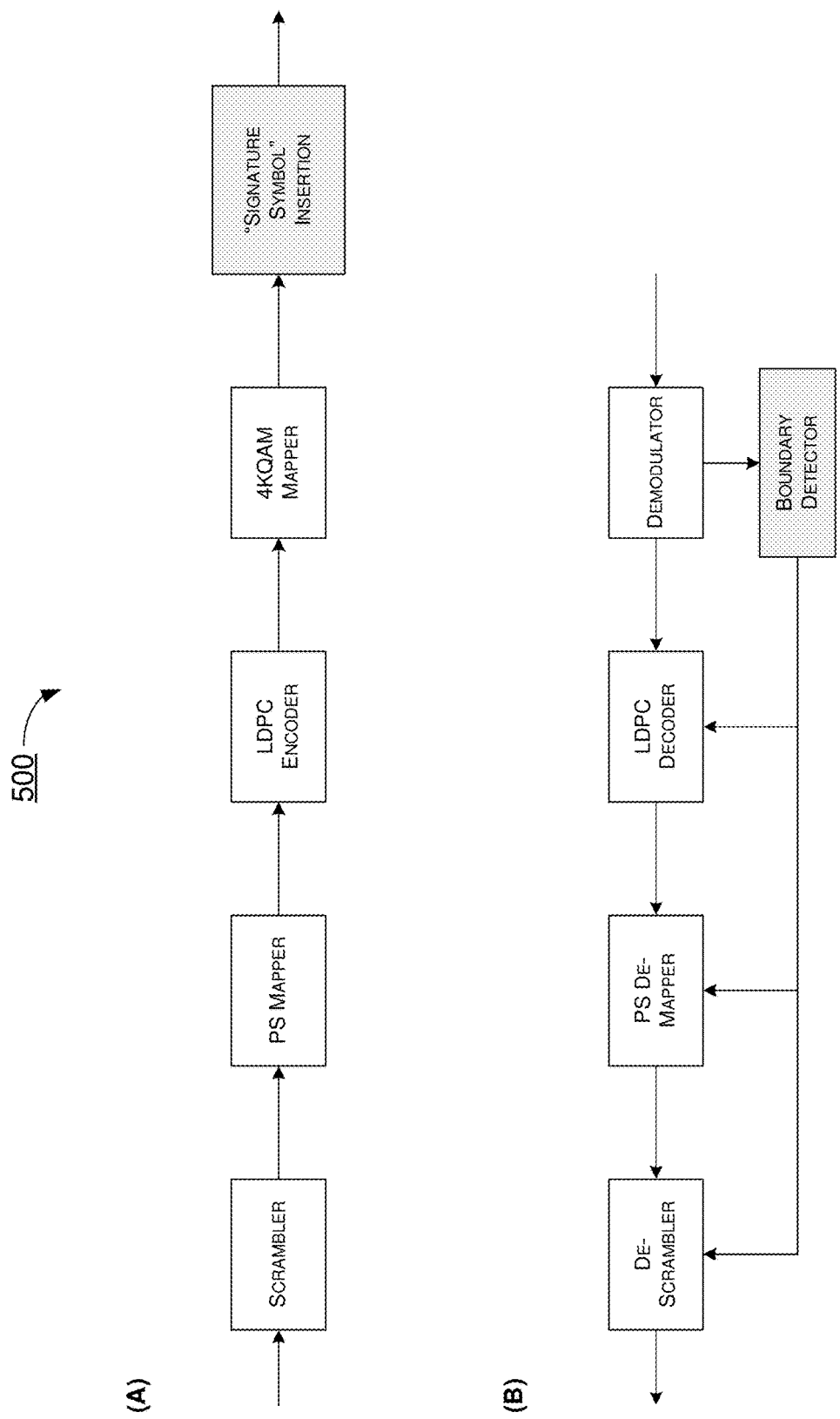
FIG. 5 is a diagram of an example design under a proposed scheme in accordance with the present disclosure.

FIG. 5 illustrates an example design 500 under a proposed scheme in accordance with the present disclosure. Design 500 may pertain to a processing block diagram for PS-4096QAM. Referring to part (A) of FIG. 5, on the transmitter side, data/information bits for transmission may first be scrambled by a scrambler before being mapped by a probabilistic shaping (PS) mapper and then encoded by a low-density parity-check (LDPC) encoder. Encoded bits output by the LDPC encoder may be mapped by a 4096QAM mapper and, under the proposed scheme, certain unused constellation points may be selected or otherwise as "signature symbols" and inserted, as boundaries between every two adjacent sub-MPDUs or MPDUs, on the receiver side. Referring to part (B) of FIG. 5, on the receiver side, received bits may first be demodulated by a demodulator before being decoded by a LDPC decoder, de-mapped by a PS de-mapper and then descrambled by a descrambler. Under the proposed scheme, a boundary detector (which may be hard- or soft-bits based) may be utilized to detect the signature symbols (as boundaries between every two adjacent sub-MPDUs or MPDUs) in the received bits and provide information of the signature symbols (e.g., constellation points of the signature symbols) to the LDPC decoder, PS de-mapper and descrambler.

Figure 6:
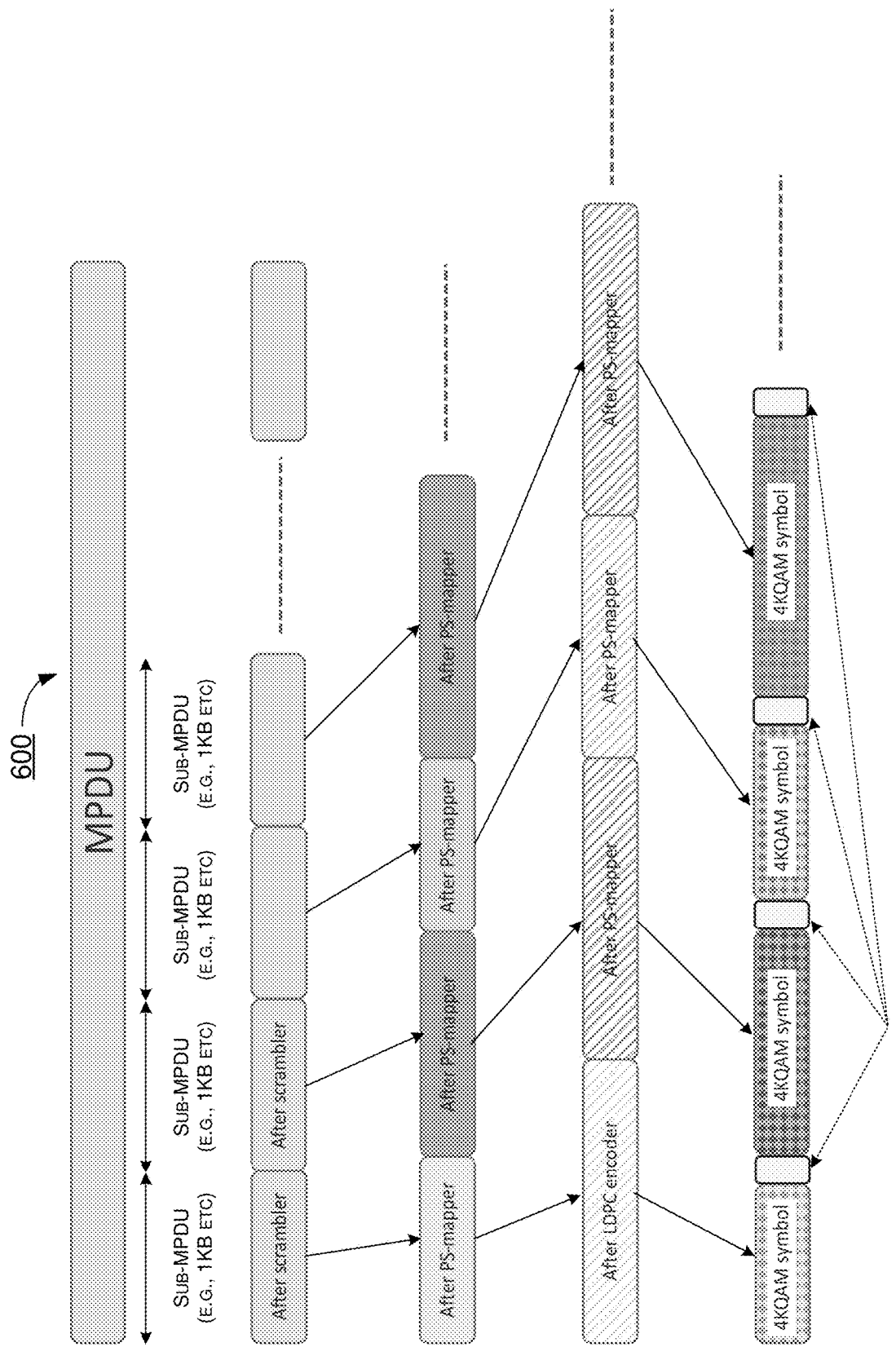
FIG. 6 is a diagram of an example design under a proposed scheme in accordance with the present disclosure.

FIG. 6 illustrates an example design 600 under a proposed scheme (Option-1) in accordance with the present disclosure. Design 600 may pertain to insertion of signature symbols per sub-MPDU (with a length of a certain number of bytes such as, for example and without limitation, 1 kilo bytes (1 KB)). Referring to FIG. 6, a given MPDU may be split or otherwise separated into a plurality of sub-MPDUs (e.g., each of 1 KB bytes or another size). Each of the sub-MPDUs may be scrambled by a scrambler, then mapped by a PS mapper and then encoded by a LDPC encoder before being modulated by a 4096QAM modulator. The size of each sub-MPDU may change respectively after each process. Certain unused constellation points may be selected or otherwise and then inserted as one or more signature symbols between adjacent groups of 4096QAM (or 4KQAM) symbols corresponding to two adjacent modulated sub-MPDUs.

Figure 7:
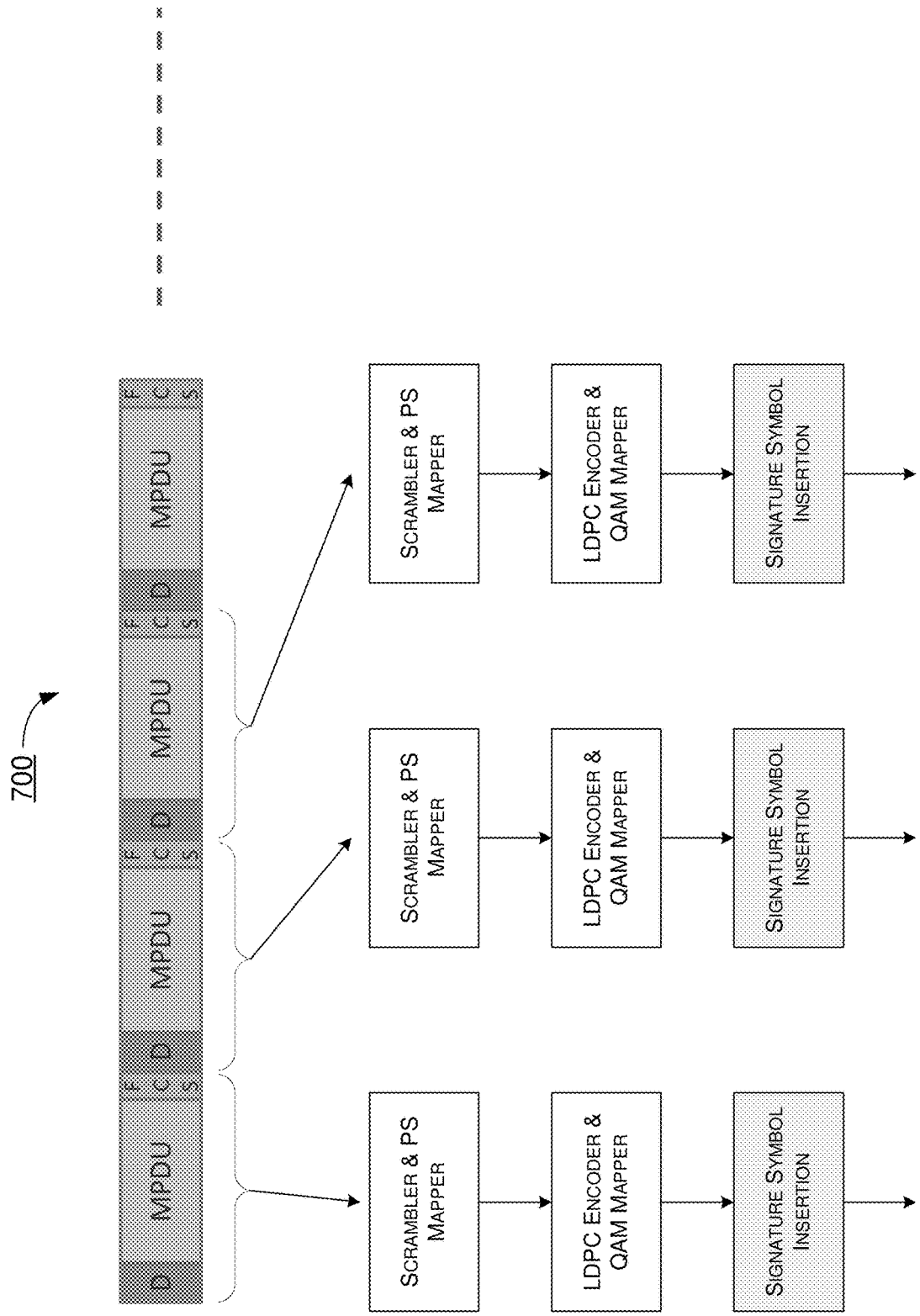
FIG. 7 is a diagram of an example design under a proposed scheme in accordance with the present disclosure.

FIG. 7 illustrates an example design 700 under a proposed scheme (Option-2) in accordance with the present disclosure. Design 700 may pertain to insertion of signature symbols per MPDU. Referring to FIG. 7, for an aggregate of multiple MPDUs, each of the MPDUs may be scrambled by a scrambler, then mapped by a PS mapper and then encoded by a LDPC encoder before being modulated by a 4096QAM modulator. Certain unused constellation points may be selected or otherwise and then inserted as one or more signature symbols between adjacent groups of 4096QAM (or 4KQAM) symbols corresponding to two adjacent modulated MPDUs.

Figure 8:
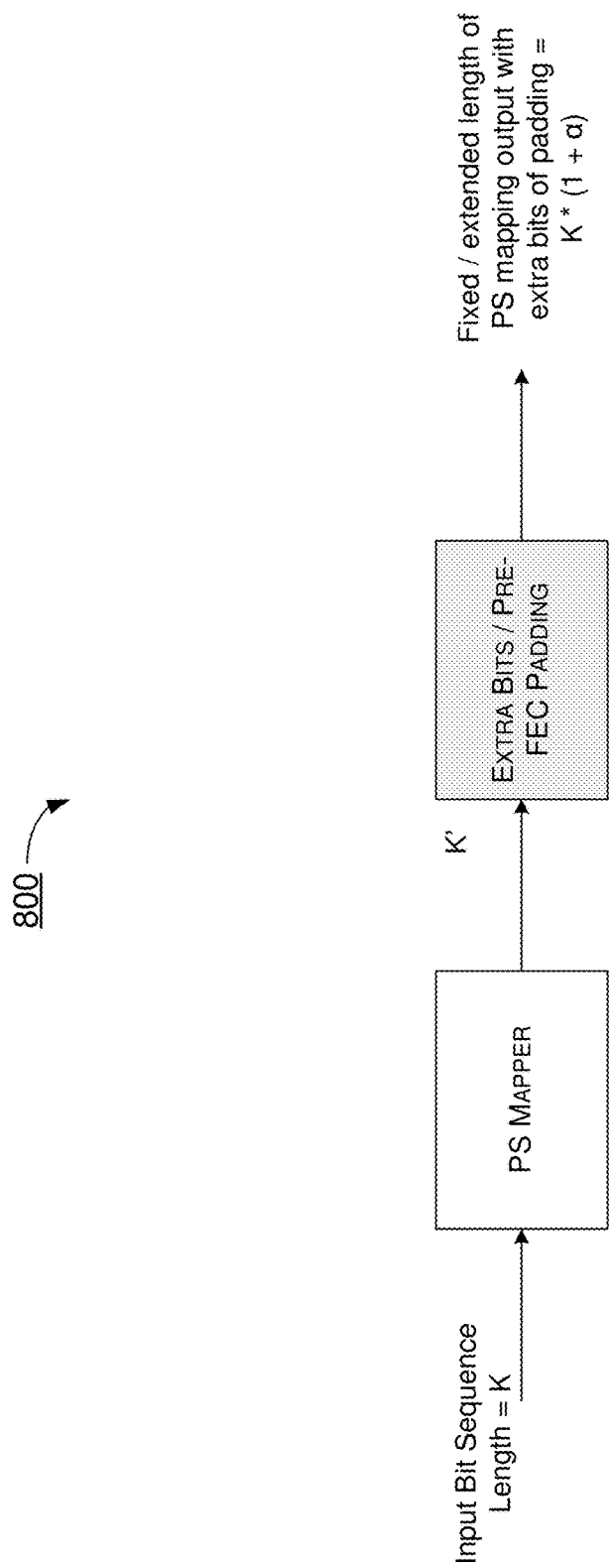
FIG. 8 is a diagram of an example design under a proposed scheme in accordance with the present disclosure.

FIG. 8 illustrates an example design 800 under a proposed scheme in accordance with the present disclosure. Design 800 may pertain to the parameter "α" for an extended packet length. Under the proposed scheme, the concept of "extended" packet length may be utilized in that the "extended" packet length may be predicted and calculated based on a programmable or predefined (or fixed) parameter α. This parameter a may represent a percentage of "possible" increase of packet length after PS mapping relative to the length of a given input sequence. Moreover, α may be configured or predefined (or fixed) with any value in a range of 9%~12% which may be obtained statistically from simulations.

Under a proposed scheme in accordance with the present disclosure with respect to transmission of PS modulation, for Physical Layer Convergence Protocol (PLCP) service data unit (PSDU) bit sequence (with length L) input to the PS mapper, an entire PSDU sequence L may be split to N sub-sequences, and each sub-sequence may have a fixed or predefined length K in terms of number of integers of 32 or other values, with L=N*K. Additionally, the output of the PS mapper of each sub-sequence may be padded with extra bits to render the length of the output of the PS mapper to be a fixed length after extra padding. The fixed length of each sub-sequence output by the PS mapper after extra padding may be predefined by using the parameter α or in other ways. On the transmitter side, after PS mapping and extra padding (or pre-forward error correction (FEC) padding or post-FEC padding), the bit sequences may go through the LDPC encoder and QAM mapping (e.g., 1024QAM or 4096QAM), and so forth, and be transmitted with orthogonal frequency-division multiplexing (OFDM) symbols. On the receiver side, after receipt, the received signals may be processed with demodulation, LDPC decoding, and so on, to result in bit sequences with the same fixed or predefined lengths length as inputs to the PS de-mapper. Advantageously, no matter whether or not there are decoding errors, the PS de-mapper may always output K bits per K*(1+α) bits or any other predefined length.

Figure 9:
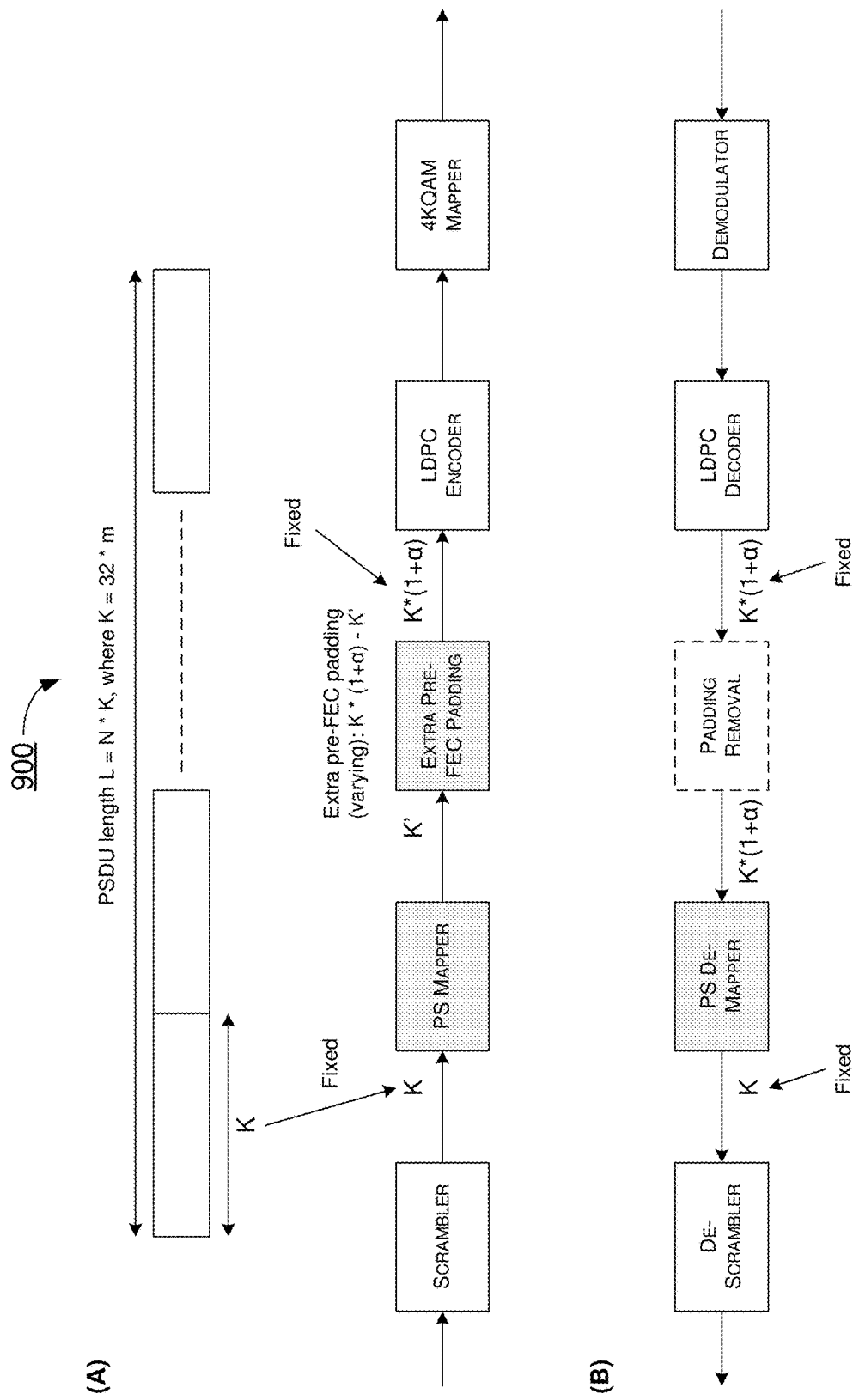
FIG. 9 is a diagram of an example design under a proposed scheme in accordance with the present disclosure.

FIG. 9 illustrates an example design 900 under a proposed scheme (Option-3) in accordance with the present disclosure. Design 900 may pertain to extra pre-FEC padding per PS mapper input size. Referring to FIG. 9, on the transmitter side, an entire PSDU (e.g., formed from an A-MPDU), with length L, may be split into a plurality of subblocks, with the length K of each subblock being an integer multiple of 32 bits (or another number of bits), such that L=N*K, where K=32*m with m being an integer equal to or greater than 1. Each of the subblocks may be scrambled by a scrambler, then mapped by a PS mapper and then encoded by a LDPC encoder before being modulated by a 4096QAM modulator. The length of each subblock may be fixed at K bits after being scrambled and input to the PS mapper, while the length of each PS-mapped subblock at the output of the PS mapper may be a variable K', which may be different than K. Under the proposed scheme, extra pre-FEC padding of K*(1+α)−K' bits may be performed prior to LDPC encoding so that the resultant length of each padded subblock may be fixed at K*(1+α) bits.

Referring to FIG. 9, the receiver side, after demodulation and LDPC decoding the output of the LDPC decoder may be fixed at K*(1+α) bits. Optionally, padding removal may or may not be performed between LDPC decoding and PS de-mapping. In any event, the length of each LDPC-decoded subblock may be fixed at K*(1+α) bits at the input of the PS de-mapper. Then, after PS de-mapping, the length of each de-mapped subblock may be fixed at K bits. That is, for every K*(1+α) bits of input provided to the PS de-mapper, the output may always be with a length of K bits. Accordingly, the error propagation issue and MPDU delimiter issue described above may be avoided or otherwise mitigated.

Figure 10:
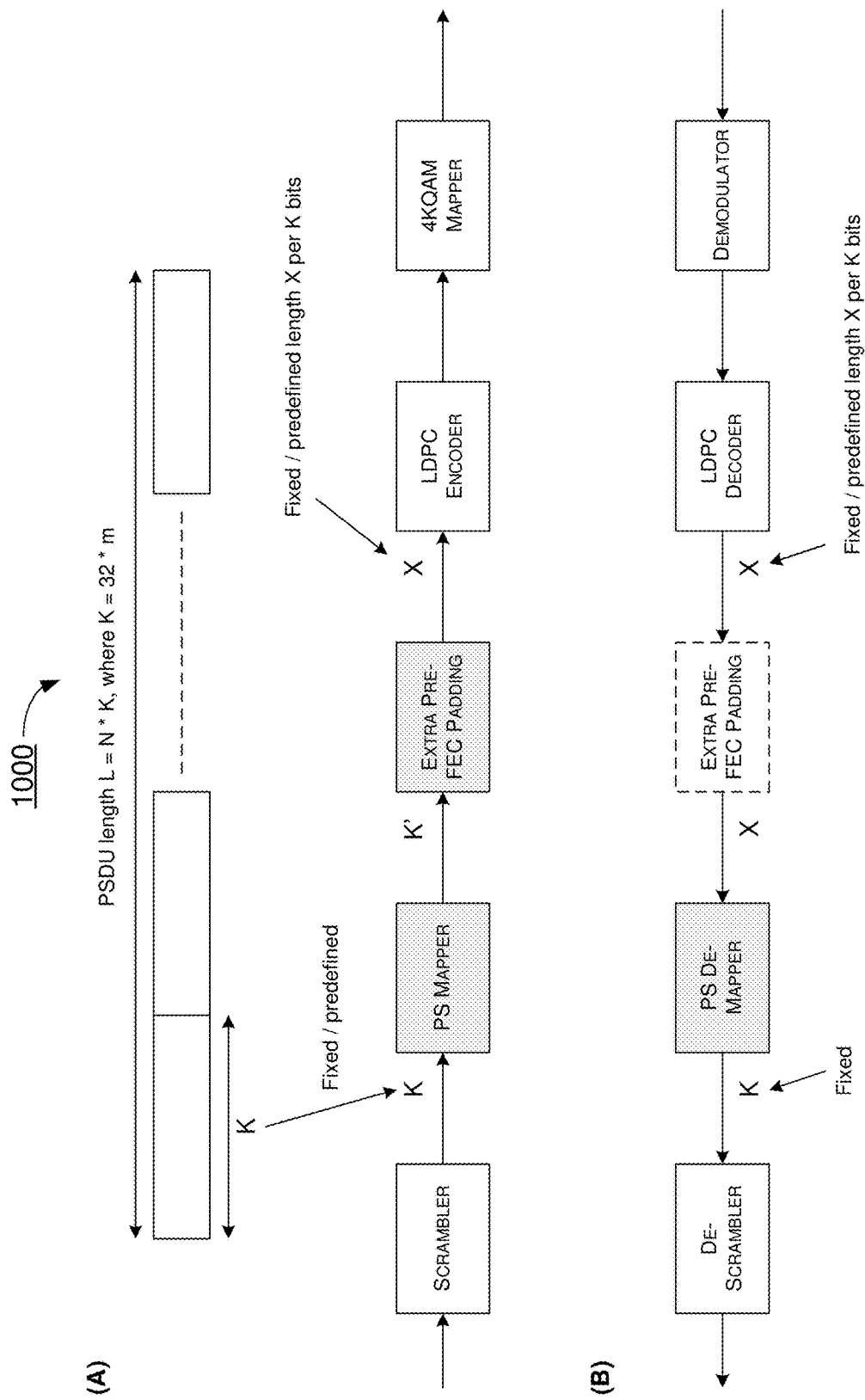
FIG. 10 is a diagram of an example design under a proposed scheme in accordance with the present disclosure.

FIG. 10 illustrates an example design 1000 under a proposed scheme (Option-4) in accordance with the present disclosure. Design 1000 may pertain to a fixed output length by extra padding per predefined PS mapper input size. Referring to FIG. 10, on the transmitter side, an entire PSDU (e.g., formed from an A-MPDU), with length L, may be split into a plurality of subblocks, with the length K of each subblock being an integer of 32 bits (or another number of bits), such that L=N*K, where K=32*m with m being an integer equal to or greater than 1. Each of the subblocks may be scrambled by a scrambler, then mapped by a PS mapper and then encoded by a LDPC encoder before being modulated by a 4096QAM modulator. The length of each subblock may be fixed at K bits after being scrambled and input to the PS mapper, while the length of each PS-mapped subblock at the output of the PS mapper may be a variable K', which may be different than K. Under the proposed scheme, extra padding may be performed prior to LDPC encoding so that the resultant length of each padded subblock may be fixed at a predefined X bits.

Referring to FIG. 10, the receiver side, after demodulation and LDPC decoding the output of the LDPC decoder may be fixed at X bits. Optionally, padding removal may or may not be performed between LDPC decoding and PS de-mapping. In any event, the length of each LDPC-decoded subblock may be fixed at X bits at the input of the PS de-mapper. Then, after PS de-mapping, the length of each de-mapped subblock may be fixed at K bits. That is, for every X bits of input provided to the PS de-mapper, the output may always be with a length of K bits. Accordingly, the error propagation issue and MPDU delimiter issue described above may be avoided or otherwise mitigated.

Illustrative Implementations

Figure 11:
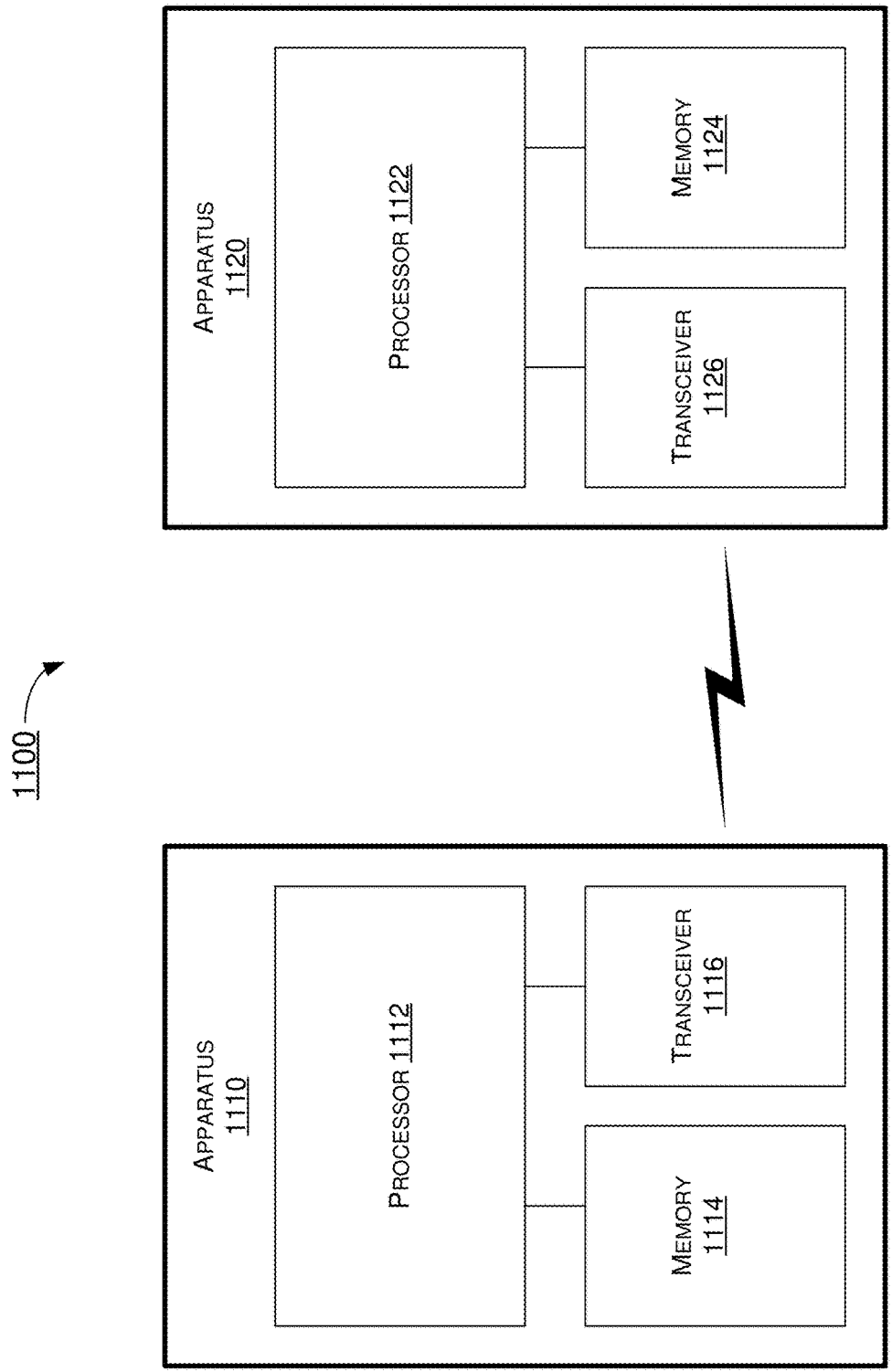
FIG. 11 is a block diagram of an example communication system in accordance with an implementation of the present disclosure.

FIG. 11 illustrates an example system 1100 having at least an example apparatus 1110 and an example apparatus 1120 in accordance with an implementation of the present disclosure. Each of apparatus 1110 and apparatus 1120 may perform various functions to implement schemes, techniques, processes and methods described herein pertaining to transmission methods of probabilistic shaping modulation in wireless communications, including the various schemes described above with respect to various proposed designs, concepts, schemes, systems and methods described above as well as processes described below. For instance, apparatus 1110 may be implemented in STA 110 and apparatus 1120 may be implemented in STA 120, or vice versa.

Each of apparatus 1110 and apparatus 1120 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 1110 and apparatus 1120 may be implemented in a smartphone, a smart watch, a personal digital assistant, a digital camera, or a computing equipment such as a tablet computer, a laptop computer or a notebook computer. Each of apparatus 1110 and apparatus 1120 may also be a part of a machine type apparatus, which may be an IoT apparatus such as an immobile or a stationary apparatus, a home apparatus, a wire communication apparatus or a computing apparatus. For instance, each of apparatus 1110 and apparatus 1120 may be implemented in a smart thermostat, a smart fridge, a smart door lock, a wireless speaker or a home control center. When implemented in or as a network apparatus, apparatus 1110 and/or apparatus 1120 may be implemented in a network node, such as an AP in a WLAN.

In some implementations, each of apparatus 1110 and apparatus 1120 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1110 and apparatus 1120 may be implemented in or as a STA or an AP. Each of apparatus 1110 and apparatus 1120 may include at least some of those components shown in FIG. 11 such as a processor 1112 and a processor 1122, respectively, for example. Each of apparatus 1110 and apparatus 1120 may further include one or more other components not pertinent to the proposed scheme of the present disclosure (e.g., internal power supply, display device and/or user interface device), and, thus, such component(s) of apparatus 1110 and apparatus 1120 are neither shown in FIG. 11 nor described below in the interest of simplicity and brevity.

In one aspect, each of processor 1112 and processor 1122 may be implemented in the form of one or more single-core processors, one or more multi-core processors, one or more RISC processors or one or more CISC processors. That is, even though a singular term "a processor" is used herein to refer to processor 1112 and processor 1122, each of processor 1112 and processor 1122 may include multiple processors in some implementations and a single processor in other implementations in accordance with the present disclosure. In another aspect, each of processor 1112 and processor 1122 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1112 and processor 1122 is a special-purpose machine specifically designed, arranged and configured to perform specific tasks including those pertaining to transmission methods of probabilistic shaping modulation in wireless communications in accordance with various implementations of the present disclosure.

In some implementations, apparatus 1110 may also include a transceiver 1116 coupled to processor 1112. Transceiver 1116 may include a transmitter capable of wirelessly transmitting and a receiver capable of wirelessly receiving data. In some implementations, apparatus 1120 may also include a transceiver 1126 coupled to processor 1122. Transceiver 1126 may include a transmitter capable of wirelessly transmitting and a receiver capable of wirelessly receiving data. It is noteworthy that, although transceiver 1116 and transceiver 1126 are illustrated as being external to and separate from processor 1112 and processor 1122, respectively, in some implementations, transceiver 1116 may be an integral part of processor 1112 as a system on chip (SoC), and transceiver 1126 may be an integral part of processor 1122 as a SoC.

In some implementations, apparatus 1110 may further include a memory 1114 coupled to processor 1112 and capable of being accessed by processor 1112 and storing data therein. In some implementations, apparatus 1120 may further include a memory 1124 coupled to processor 1122 and capable of being accessed by processor 1122 and storing data therein. Each of memory 1114 and memory 1124 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1114 and memory 1124 may include a type of read-only memory (ROM) such as mask ROM, programmable ROM (PROM), erasable programmable ROM (EPROM) and/or electrically erasable programmable ROM (EEPROM). Alternatively, or additionally, each of memory 1114 and memory 1124 may include a type of non-volatile random-access memory (NVRAM) such as flash memory, solid-state memory, ferroelectric RAM (FeRAM), magnetoresistive RAM (MRAM) and/or phase-change memory.

Each of apparatus 1110 and apparatus 1120 may be a communication entity capable of communicating with each other using various proposed schemes in accordance with the present disclosure. For illustrative purposes and without limitation, functionalities and capabilities of apparatus 1110, as STA 110, and apparatus 1120, as STA 120, may be described below in the context of example processes 1200, 1300 and 1400. It is noteworthy that, although a detailed description of capabilities, functionalities and/or technical features of one of apparatus 1110 and apparatus 1120 is provided below, the same may be applied to the other of apparatus 1110 and apparatus 1120 although a detailed description thereof is not provided solely in the interest of brevity. It is also noteworthy that, although the example implementations described below are provided in the context of WLAN, the same may be implemented in other types of networks.

Illustrative Processes

FIG. 12 illustrates an example process 1200 in accordance with an implementation of the present disclosure. Process 1200 may represent an aspect of implementing various proposed designs, concepts, schemes, systems and methods described above. More specifically, process 1200 may represent an aspect of the proposed concepts and schemes pertaining to transmission methods of probabilistic shaping modulation in wireless communications in accordance with the present disclosure. Process 1200 may include one or more operations, actions, or functions as illustrated by one or more of blocks 1210 and 1220. Although illustrated as discrete blocks, various blocks of process 1200 may be divided into additional blocks, combined into fewer blocks, or eliminated, depending on the desired implementation. Moreover, the blocks/sub-blocks of process 1200 may be executed in the order shown in FIG. 12 or, alternatively, in a different order. Furthermore, one or more of the blocks/sub-blocks of process 1200 may be executed repeatedly or iteratively. Process 1200 may be implemented by or in apparatus 1110 and apparatus 1120 as well as any variations thereof. Solely for illustrative purposes and without limiting the scope, process 1200 is described below in the context of apparatus 1110 implemented in or as STA 110 functioning as a non-AP STA and apparatus 1120 implemented in or as STA 120 functioning as an AP STA of a wireless network such as a WLAN in network environment 100 in accordance with one or more of IEEE 802.11 standards. Process 1200 may begin at block 1210.

At 1210, process 1200 may involve processor 1112 of apparatus 1110 processing each subblock of a plurality of subblocks of a data unit by padding each subblock after scrambling and PS mapping each subblock to result in each subblock having a fixed length before further processing including encoding and modulation. Process 1200 may proceed from 1210 to 1220.

At 1220, process 1200 may involve processor 1112 transmitting, via transceiver 1116, the plurality of processed subblocks (e.g., to apparatus 1120 as STA 120).

In some implementations, K may be an integer multiple of 32, α may be a configured or predefined parameter, a length of each subblock before the PS mapping may be fixed at K bits, and a length of each subblock after the padding may be fixed at $K*(1+\alpha)$ bits. In some implementations, a value of α may be in a range of 9%~12%.

In some implementations, K may be an integer multiple of 32, X may be a fixed or predefined value, a length of each subblock before PS mapping may be fixed at K bits, and a length of each subblock after the padding may be fixed at X bits.

In some implementations, in encoding, process 1200 may involve processor 1112 performing LDPC encoding. Moreover, in modulation, process 1200 may involve processor 1112 performing 4096 QAM.

FIG. 13 illustrates an example process 1300 in accordance with an implementation of the present disclosure. Process 1300 may represent an aspect of implementing various proposed designs, concepts, schemes, systems and methods described above. More specifically, process 1300 may represent an aspect of the proposed concepts and schemes pertaining to transmission methods of probabilistic shaping modulation in wireless communications in accordance with the present disclosure. Process 1300 may include one or more operations, actions, or functions as illustrated by one or more of blocks 1310 and 1320. Although illustrated as discrete blocks, various blocks of process 1300 may be divided into additional blocks, combined into fewer blocks, or eliminated, depending on the desired implementation. Moreover, the blocks/sub-blocks of process 1300 may be executed in the order shown in FIG. 13 or, alternatively, in a different order. Furthermore, one or more of the blocks/sub-blocks of process 1300 may be executed repeatedly or iteratively. Process 1300 may be implemented by or in apparatus 1110 and apparatus 1120 as well as any variations thereof. Solely for illustrative purposes and without limiting the scope, process 1300 is described below in the context of apparatus 1110 implemented in or as STA 110 functioning as a non-AP STA and apparatus 1120 implemented in or as STA 120 functioning as an AP STA of a wireless network such as a WLAN in network environment 100 in accordance with one or more of IEEE 802.11 standards. Process 1300 may begin at block 1310.

At 1310, process 1300 may involve processor 1122 of apparatus 1120 receiving, via transceiver 1126, a plurality of subblocks of a data unit (e.g., from apparatus 1110 as STA 110). Process 1300 may proceed from 1310 to 1320.

At 1320, process 1300 may involve processor 1122 processing each subblock of the plurality of subblocks by de-mapping each subblock using a PS de-mapper after performing demodulation and decoding on each subblock. The PS de-mapper may output a first fixed number of output bits for every second fixed number of input bits.

In some implementations, K may denote the first fixed number of output bits of the PS de-mapper and may be an integer multiple of 32, α may be a configured or predefined parameter, $K*(1+\alpha)$ may denote the second fixed number of input bits to the PS de-mapper, a length of each subblock before the PS de-mapping may be fixed at $K*(1+\alpha)$ bits, and a length of each subblock after the PS de-mapping may be fixed at K bits. In some implementations, a value of α may be in a range of 9%~12%.

In some implementations, K may denote the first fixed number of output bits of the PS de-mapper and may be an integer multiple of 32, X may denote the second fixed number of input bits to the PS de-mapper and may be a fixed or predefined value, a length of each subblock before the PS de-mapping may be fixed at X bits, and a length of each subblock after the PS de-mapping may be fixed at K bits.

In some implementations, in decoding, process 1300 may involve processor 1122 performing LDPC decoding. Moreover, in demodulation, process 1300 may involve processor 1122 performing 4096 QAM demodulation.

FIG. 14 illustrates an example process 1400 in accordance with an implementation of the present disclosure. Process 1400 may represent an aspect of implementing various proposed designs, concepts, schemes, systems and methods described above. More specifically, process 1400 may represent an aspect of the proposed concepts and schemes pertaining to transmission methods of probabilistic shaping modulation in wireless communications in accordance with the present disclosure. Process 1400 may include one or more operations, actions, or functions as illustrated by one or more of blocks 1410, 1420 and 1430. Although illustrated as discrete blocks, various blocks of process 1400 may be divided into additional blocks, combined into fewer blocks, or eliminated, depending on the desired implementation. Moreover, the blocks/sub-blocks of process 1400 may be executed in the order shown in FIG. 14 or, alternatively, in a different order. Furthermore, one or more of the blocks/sub-blocks of process 1400 may be executed repeatedly or iteratively. Process 1400 may be implemented by or in apparatus 1110 and apparatus 1120 as well as any variations thereof. Solely for illustrative purposes and without limiting the scope, process 1400 is described below in the context of apparatus 1110 implemented in or as STA 110 functioning as a non-AP STA and apparatus 1120 implemented in or as STA 120 functioning as an AP STA of a wireless network such as a WLAN in network environment 100 in accordance with one or more of IEEE 802.11 standards. Process 1400 may begin at block 1410.

At 1410, process 1400 may involve processor 1112 of apparatus 1110 selecting one or more unused constellation points in a PS modulation plot as one or more signature symbols. Process 1400 may proceed from 1410 to 1420.

At 1420, process 1400 may involve processor 1112 processing a data unit by inserting the one or more signature symbols after every fixed number of bits of the data unit having been scrambled, PS mapped, encoded and QAM modulated. Process 1400 may proceed from 1420 to 1430.

At 1430, process 1400 may involve processor 1112 transmitting, via transceiver 1116, the processed data unit (e.g., to apparatus 1120 as STA 120)

In some implementations, the data unit may include an MPDU. In such cases, in processing, process 1400 may further involve processor 1112 splitting the MPDU into a plurality of sub-MPDUs. Moreover, in inserting, process 1400 may involve processor 1112 inserting the one or more signature symbols after each sub-MPDU having been scrambled, PS mapped, encoded and QAM modulated.

In some implementations, the data unit may include an A-MPDU comprising a plurality of MPDUs. In such cases, in inserting, process 1400 may involve processor 1112 inserting the one or more signature symbols after each MPDU having been scrambled, PS mapped, encoded and QAM modulated.

In some implementations, the PS modulation plot may include a PS 4096 QAM (PS-4KQAM) plot. In some implementations, in selecting, process 1400 may involve processor 1112 selecting one or more constellation points from 496 unused constellation points in the PS-4KQAM plot.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
  processing, by a processor of an apparatus, each subblock of a plurality of subblocks of a data unit by:
    scrambling, by a scrambler of the processor, and probabilistic shaping (PS) mapping, by a PS mapper of the processor, each subblock of the plurality of subblocks to provide a plurality of scrambled and PS mapped subblocks;
    padding, by a padding circuit of the processor, each of the plurality of scrambled and PS mapped subblocks to result in each of the plurality of scrambled and PS mapped subblocks having a fixed length to provide a plurality of scrambled, PS mapped and padded subblocks; and
    encoding, by an encoder of the processor, and modulating, by a modulator of the processor, the plurality of scrambled, PS mapped and padded subblocks to provide a plurality of processed subblocks; and
  transmitting, by the processor, the plurality of processed subblocks, wherein a length of each subblock after the padding is fixed at either:
    $K*(1+\alpha)$ bits, or
    X bits;
  wherein a length of each subblock before the PS mapping is fixed at K bits,
  wherein K is an integer multiple of 32,
  wherein $\alpha$ is a configured or predefined parameter representing a percentage of an increase in length of the data unit after the PS mapping relative to a length of the data unit prior to the processing, and
  wherein X is a fixed or predefined value.

2. The method of claim 1, wherein a value of $\alpha$ is in a range of 9% ~12%.

3. The method of claim 1, wherein the encoding comprises low-density parity-check (LDPC) encoding, and wherein the modulation comprises 4096 quadrature amplitude modulation (QAM).

4. A method, comprising:
  receiving, by a processor of an apparatus, a plurality of subblocks of a data unit comprising a plurality of bits; and
  processing, by the processor, each subblock of the plurality of subblocks by:
    performing demodulation, by a demodulator of the processor, and decoding, by a decoder of the processor, on each subblock of the plurality of subblocks to provide a plurality of demodulated and decoded subblocks; and
    de-mapping each subblock of the plurality of demodulated and decoded subblocks using a probabilistic shaping (PS) de-mapper of the processor to provide a plurality of processed subblocks,
  wherein, for every second fixed number of input bits of each subblock of the plurality of demodulated and decoded subblocks, the PS de-mapper outputs a first fixed number of output bits of each subblock of the plurality of processed subblocks,
  wherein a length of each subblock before the PS de-mapping is fixed at either:
    $K*(1+\alpha)$ bits; or
    X bits,
  wherein a length of each subblock after the PS de-mapping is fixed at K bits,
  wherein K denotes the first fixed number of output bits of the PS de-mapper and is an integer multiple of 32,
  wherein $\alpha$ is a configured or predefined parameter representing a percentage of an increase in length of the data unit after the PS mapping relative to a length of the data unit prior to the processing,
  wherein $K*(1+\alpha)$ denotes the second fixed number of input bits to the PS de-mapper, and
  wherein X denotes the second fixed number of input bits to the PS de-mapper and is a fixed or predefined value.

5. The method of claim 4, wherein a value of a is in a range of 9% ~12%.

6. The method of claim 4, wherein the decoding comprises low-density parity-check (LDPC) decoding, and wherein the demodulation comprises 4096 quadrature amplitude modulation (QAM) demodulation.

* * * * *